April 29, 1924.
P. CALABRESE
AUTOMOBILE SNOWPLOW
Filed Oct. 24, 1923
1,492,120
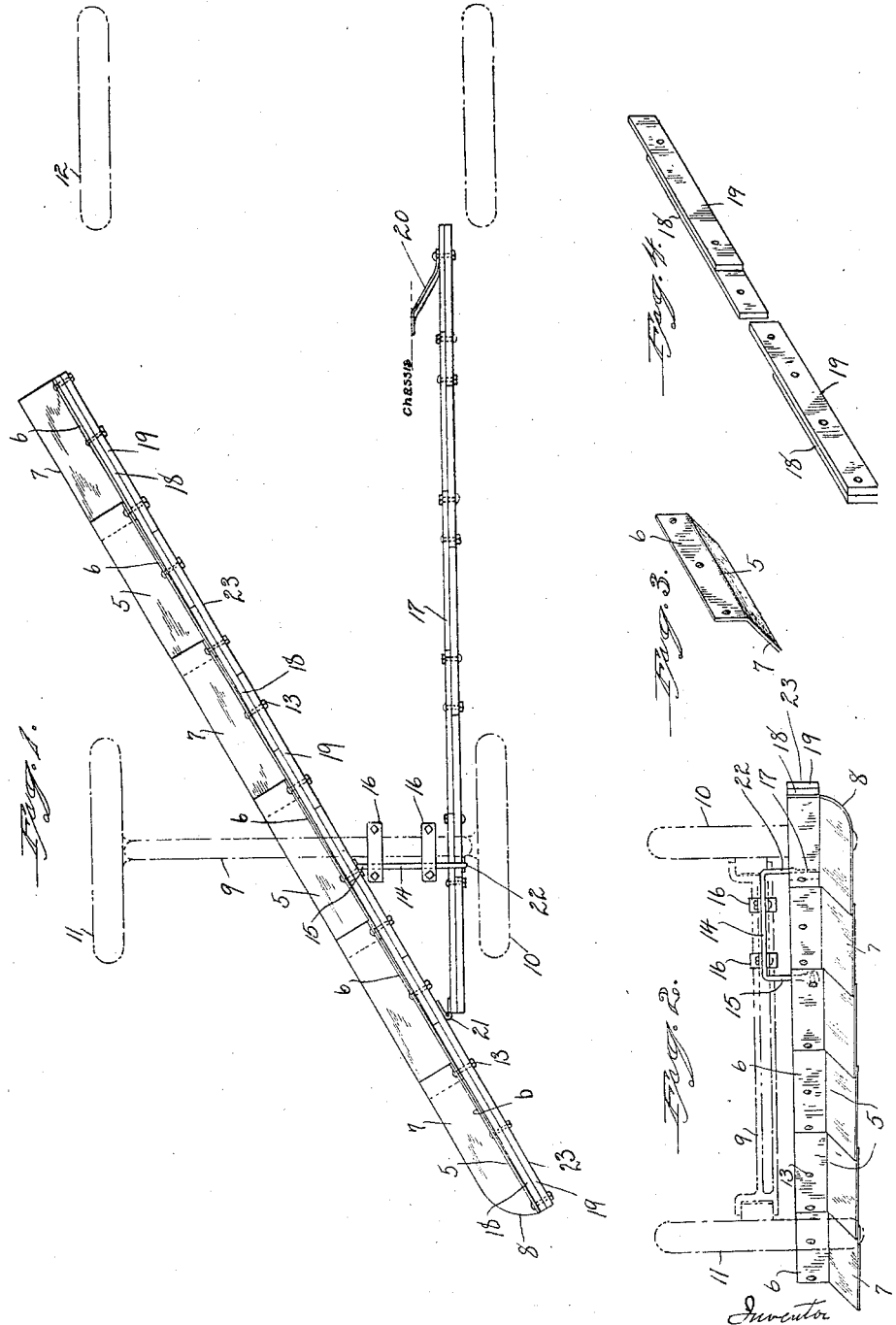
Inventor
Pasquale Calabrese Patented Apr. 29, 1924.

1,492,120

UNITED STATES PATENT OFFICE.

PASQUALE CALABRESE, OF NEW HAVEN, CONNECTICUT.

AUTOMOBILE SNOWPLOW.

Application filed October 24, 1923. Serial No. 670,459.

*To all whom it may concern:*

Be it known that I, PASQUALE CALABRESE, a subject of the King of Italy, residing at New Haven, in the county of New Haven and State of Connecticut, have invented a new and useful Improvement in Automobile Snowplows; and I do hereby declare the following, when taken in connection with the accompanying drawings and the characters of reference marked thereon, to be a full, clear, and exact description of the same, and which said drawings constitute part of this application, and represent, in—

Fig. 1, a plan view of my improved snow plow indicating its attachment to an automobile.

Fig. 2, a front view of the same.

Fig. 3, a perspective view of one of the plow members detached.

Fig. 4, a perspective view of two sections of the plow reinforcing-bar detached.

This invention relates to improvement in automobile snow plows. The object of the invention is to provide a plow which can be readily attached and detached to an automobile, and when not in use packed into close compass, so as to be readily transported, and the invention consists in an automobile snow plow having certain details of construction as will be hereinafter described and particularly recited in the claims.

In carrying out my invention, I employ a plow formed from sheet-metal and composed of a plurality of relatively short sections 5, each comprising a wall 6 and a scraping-edge 7. These sections are adapted to be secured together by lapping their ends and connecting them by bolts 13. These bolts extend through a reinforcing-bar 23 preferably formed from strips of wood 18 and 19, which are bolted together, so that the end of one projects beyond the end of the other, so as to break joint. The plow is supported by means of a yoke 14, one end 15 of which is secured to one of the plow sections. This yoke is secured to the front axle 9 by means of clips 16. To brace the forward end of the plow, so as to hold it in proper position, I employ a brace 17, preferably formed like the reinforcing-bar 23 just described, and is connected by an arm 20 or other means to some part of the chassis, so as to be held against rearward movement. Preferably, the forward end of the brace will be secured to the plow by a hinge 21, and the brace will be connected with the other arm 22 of the yoke 14. These sections are adapted, as stated above, to be secured together, so as to form a long plow, and the outer end 8 of the front section is preferably rounded. This plow is arranged to pass beneath the front axle 9 of a motor vehicle, so as to project beyond the left front wheel 10 and in an inclined position, so as to pass back of the right front wheel 11 and in front of the right rear wheel 12.

When the parts are assembled and arranged, as shown and described, a plow is provided which projects forward of the front left wheel, so as to clear snow away from it, to permit the operator to steer, and the snow is then carried away to the right, forward of the rear wheels, so that traction is secured.

Constructed as shown, the device provides a rigid snow plow and when not in use, the parts can be readily separated, so as to be packed into small space, and can conveniently be carried on a running board, or luggage rack, yet assembled and applied very quickly when necessary.

I claim:

1. A snow plow for automobiles, comprising a sectional plow and a sectional brace, said sections detachably connected together, the brace being arranged longitudinally and the plow at an angle thereto and secured to the outer end of the brace, and means for supporting said plow and brace from the front axle.

2. A snow plow for automobiles, comprising a plow formed from a series of metal members detachably secured together and each having a vertical wall and a scraping-edge, a plow bar formed from a series of sections detachably connected together and to which the scraper members are attached, a brace bar formed from a series of members detachably secured together and the outer end of the brace detachably secured to the plow, and a yoke mounted on the front axle, with its ends extending downwardly therefrom, and having its ends respectively connected with the plow and brace.

In testimony whereof, I have signed this specification in the presence of two subscribing witnesses.

PASQUALE CALABRESE.

Witnesses:
FREDERIC C. EARLE,
MALCOLM P. NICHOLS.